(12) United States Patent
Miura

(10) Patent No.: US 9,198,230 B2
(45) Date of Patent: Nov. 24, 2015

(54) RADIO BASE STATION AND COMMUNICATION CONTROL METHOD

(75) Inventor: Takanori Miura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 572 days.

(21) Appl. No.: 13/637,293

(22) PCT Filed: Mar. 24, 2011

(86) PCT No.: PCT/JP2011/057236
§ 371 (c)(1),
(2), (4) Date: Sep. 25, 2012

(87) PCT Pub. No.: WO2011/118729
PCT Pub. Date: Sep. 29, 2011

(65) Prior Publication Data
US 2013/0021938 A1 Jan. 24, 2013

(30) Foreign Application Priority Data
Mar. 25, 2010 (JP) .................. 2010-070653

(51) Int. Cl.
*H04W 88/08* (2009.01)
*H04B 1/40* (2015.01)
*H04W 24/02* (2009.01)

(52) U.S. Cl.
CPC ............. *H04W 88/08* (2013.01); *H04B 1/40* (2013.01); *H04W 24/02* (2013.01)

(58) Field of Classification Search
CPC .... H04B 7/2687; H04B 7/269; H04B 7/2693; H04J 11/0056; H04W 56/005
See application file for complete search history.

(56) References Cited

U.S. PATENT DOCUMENTS

| 7,573,851 B2 | 8/2009 | Xing et al. |
| 2003/0224750 A1 | 12/2003 | Sampath |

(Continued)

FOREIGN PATENT DOCUMENTS

| JP | 2007-329758 A | 12/2007 |
| JP | 2008-270915 A | 11/2008 |
| WO | 2008/129811 A1 | 10/2008 |
| WO | 2010004830 A1 | 1/2010 |

OTHER PUBLICATIONS

An Office Action; "Notice of Reasons for Rejection," issued by the Japanese Patent Office on Jan. 21, 2014, which corresponds to Japanese Patent Application No. 2010-070653 and is related to U.S. Appl. No. 13/637,293; with English language statement of relevance.

(Continued)

*Primary Examiner* — Alvin Zhu
*Assistant Examiner* — Bo Hui A. Zhu
(74) *Attorney, Agent, or Firm* — Studebaker & Brackett PC

(57) ABSTRACT

A radio base station 1 used in an FDD radio communication system in which an uplink frequency band is different from a downlink frequency band, comprises: an antenna 110; a duplexer 130 configured to extract a signal component of the uplink frequency band from a radio signal received by the antenna; a frequency converter 120 provided on a signal path between the antenna 110 and the duplexer 130 and is configured to convert a signal component of the downlink frequency band contained in the radio signal received by the antenna 110 to a signal component of the uplink frequency band; and a measurement unit 210 configured to perform a measurement on the signal component of the uplink frequency band extracted by the duplexer.

5 Claims, 12 Drawing Sheets

(56) References Cited

U.S. PATENT DOCUMENTS

| | | |
|---|---|---|
| 2007/0054701 A1* | 3/2007 | Hovers et al. .............. 455/562.1 |
| 2007/0098057 A1* | 5/2007 | Mori et al. .................... 375/219 |
| 2007/0287501 A1 | 12/2007 | Hoshina et al. |
| 2008/0225965 A1 | 9/2008 | Pi et al. |
| 2008/0260388 A1* | 10/2008 | Kim et al. .................... 398/115 |
| 2010/0104044 A1 | 4/2010 | Kishigami et al. |
| 2010/0322227 A1 | 12/2010 | Luo |
| 2011/0116383 A1 | 5/2011 | Lipka |
| 2011/0170527 A1* | 7/2011 | Yamamoto et al. ........... 370/338 |

OTHER PUBLICATIONS

3GPP TS 36.300 V9.2.0(Dec. 2009); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

International Search Report; PCT/JP2011/057236; Jun. 21, 2011.

* cited by examiner

FIG. 6

| SCHEME | TRANSMISSION SIDE | RECEPTION SIDE |
|---|---|---|
| OFDMA | MODULATION→IFFT | FFT→DEMODULATION |
| SC-FDMA | MODULATION→DFT→MODULATION→IFFT | FFT→DEMODULATION→IDFT→DEMODULATION |

SHARED   SHARED

RADIO BASE STATION AND COMMUNICATION CONTROL METHOD

TECHNICAL FIELD

The present invention relates to a radio base station and a communication control method adopting SON.

BACKGROUND ART

As a radio access scheme, LTE (Long Term Evolution) which is standardized by the 3GPP (3rd Generation Partnership Project), a standardization body for radio communication systems, adopts OFDMA (Orthogonal Frequency Division Multiple Access) for a downlink and adopts SC-FDMA (Single Carrier-Frequency Division Multiple Access) for an uplink.

Also, the LTE mainly adopts FDD (Frequency Division Duplex) as a duplex scheme for separating the downlink from the uplink. When the FDD is adopted, a frequency band of the uplink is different from that of the downlink.

The 3GPP proposes a method for a situation where a radio base station (which is referred to as "eNB" in the 3GPP) is newly installed, the method enabling automatic setting of the newly-installed base station to be made by connecting the newly-installed base station to a network via a cable, and by powering on the newly-installed base station.

A technology of automatically optimizing performances such as transmission capacity, transmission delay, and frequency-and-power usage efficiency of a radio communication system as described above is called as SON (Self Organized Network). With the SON, measurement or setting in situ can be automated without requiring manual operations when a radio base station is installed or maintained.

As one function of the SON, there is proposed a method in which a radio terminal (which is referred to as "UE" in the 3GPP) performing a radio communication with a radio base station reports a result of measuring a radio signal received from a base station neighboring the radio base station, and the radio base station knows an operational status of the neighboring base station (see, non-patent literature 1).

CITATION LIST

Non-Patent Literature

Non-patent literature 3GPP TS 36.300 V9.2.0 (2009-12), "22 Support for self-configuration and self-optimization"

SUMMARY OF THE INVENTION

However, there are following problems in the SON configuration utilizing measurement by a radio terminal.

A first problem is that non-negligible load is applied to the radio terminal due to signaling performed between a radio base station and a radio terminal, and scanning and measurement of a neighboring base station.

A second problem is that a radio terminal can perform the measurement at timing when a radio base station performs a radio communication with the radio terminal. Particularly, during a period from the installation of a radio base station to the start of a full-scale operation, the radio base station has difficulty performing a radio communication with a radio terminal. On the other hand, it is highly necessary to know an operational status of a neighboring base station for determining a transmission parameter for the radio base station.

For this reason, an objective of the present invention is to provide a radio base station and a communication control method which enable knowing of an operational status of a neighboring base station without giving a load to a radio terminal even at timing when a radio communication with the radio terminal is not performed.

The present invention has the following features to solve the problems described above. A feature according to a radio base station of the present invention is summarized as follows. A radio base station (radio base station 1) used in an FDD radio communication system (radio communication system 10) in which an uplink frequency band is different from a downlink frequency band, comprises: at least one antenna (antenna 110); at least one duplexer (duplexer 130) configured to extract a signal component of the uplink frequency band from a radio signal received by the antenna; a frequency converter (frequency converter 120) provided on a signal path between the antenna and the duplexer and is configured to convert a signal component of the downlink frequency band contained in the radio signal received by the antenna to a signal component of the uplink frequency band; and a measurement unit (measurement unit 210) configured to perform a measurement on the signal component of the uplink frequency band extracted by the duplexer.

With this feature, the radio base station used in an FDD radio communication system converts a signal component of a downlink frequency band (in other words, a component of a radio signal transmitted by another base station) contained in the radio signal received by the antenna to a signal component of an uplink frequency band, and then input it to the duplexer. With this, the component of the radio signal transmitted by another base station can pass through the duplexer, so that the component of the radio signal transmitted by another base station can be measured.

Accordingly, in the radio communication system adopting the FDD scheme, since the own radio base station can measure the radio signal transmitted by another station, it is possible to know an operational status of another base station without giving a load to a radio terminal even at timing when a radio communication with the radio terminal is not performed.

Another feature according to the radio base station of the present invention is summarized as follows. The radio base station further comprises a controller (controller 220) configured to, at timing when the radio base station does not perform a radio communication with a radio terminal, perform control to cause the frequency converter to perform the frequency conversion and to cause the measurement unit to perform the measurement.

Another feature according to the radio base station of the present invention is summarized as follows. The frequency converter includes a filter (filter 123) configured to extract a signal component of the downlink frequency band from a radio signal received by the antenna, a mixer (mixer 124) configured to convert the signal component of the downlink frequency band to a signal component of the uplink frequency band by mixing the signal component of the downlink frequency band with a conversion signal, and a switching unit (switches 121 and 122) configured to cause the radio signal received by the antenna to pass through or avoid the filter and the mixer by switching, and the controller controls the switching unit so that the radio signal received by the antenna passes through the filter and the mixer at the timing when the radio base station does not perform a radio communication with the radio terminal.

Another feature according to the radio base station of the present invention is summarized as follows. The radio base station further comprises: a transmitter (transmitter 180) configured to transmit a radio signal via the duplexer and the antenna; and an inter-base station communication unit (inter-base station communication unit 240) configured to receive transmission power information showing transmission power of a radio signal transmitted by another radio base station by using an inter-base station communication, wherein the measurement unit measures received power, and the controller determines a transmission parameter to be used when the transmitter performs transmission processing on a radio signal, based on received power information obtained by the measurement unit and the transmission power information received by the inter-base station communication unit.

Another feature according to the radio base station of the present invention is summarized as follows. The radio base station further comprises: a receiver (receiver 140) configured to perform reception processing on a radio signal in an SC-FDMA scheme or OFDMA scheme via the duplexer; an OFDM demodulator (OFDM demodulator 150) configured to convert the received signal obtained by the receiver from a time domain to a frequency domain and perform a primary demodulation of the resultant signal; and a frame processor (frame processor 170) configured to convert a data symbol obtained by the OFDM demodulator from a frequency domain to a time domain and perform a secondary demodulation of the resultant symbol, wherein the measurement unit performs measurement on a signal which is a signal after conversion to the frequency domain by the OFDM demodulator and the signal before conversion to the time domain by the frame processor.

A feature according to a communication control method of the present invention is summarized as follows. A communication control method for a radio base station used in an FDD radio communication system in which an uplink frequency band is different from a downlink frequency band, comprises: a frequency conversion step of performing a frequency conversion to convert a signal component of the downlink frequency band contained in a radio signal received by the antenna of the radio base station, to a signal component of the uplink frequency band; an extraction step of extracting a signal component of the uplink frequency band from the radio signal after the frequency conversion; and a measurement step of performing a measurement on the signal component of the uplink frequency band extracted by the extraction step.

Another feature according to a communication control method of the present invention is summarized as follows. The communication control method further comprises: a reception step of receiving transmission power information showing transmission power of a radio signal transmitted by another radio base station by using an inter-base station communication; and a determination step of determining a transmission parameter to be used when the radio base station performs transmission processing on the radio signal, wherein in the measurement step, received power is measured, and in the determination step, the transmission parameter is determined based on received power information showing the received power measured in the measurement step and the transmission power information received in the reception step.

The present invention can provide a radio base station and a communication control method which enable knowing of an operational status of a neighboring base station without giving a load to a radio terminal even at timing when a radio communication with the radio terminal is not performed.

BRIEF DESCRIPTION OF THE DRAWINGS

FIG. 6 is a drawing for illustrating each signal processing of an OFDMA scheme and an SC-FDMA scheme in comparison with each other.

DESCRIPTION OF THE EMBODIMENTS

Figure 1:
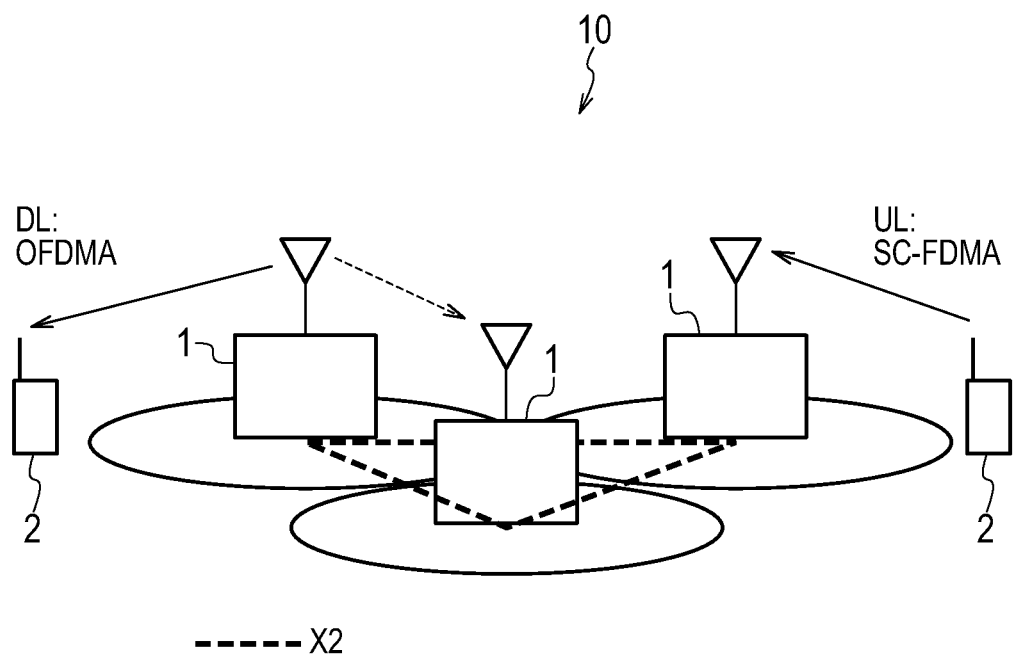
FIG. 1 is a schematic configuration diagram of a radio communication system according an embodiment of the present invention.

Referring to the drawings, an embodiment of a radio base station of the present invention is described. Specifically, the description is given to (1) Summary of Radio Communication System, (2) Configuration of Radio Base Station, (3) Example of controlling Radio Base Station, (4) Advantageous Effects, and (5) Other Embodiments. In the drawings in the following embodiments, same or similar reference numerals are given to denote same or similar portions.

(1) Summary of Radio Communication System

FIG. 1 is a schematic configuration diagram of a radio communication system 10 according the present embodiment.

For example, the radio communication system 10 has a configuration based on the LTE Release 9 which is the 3.9th generation (3.9G) mobile telephone system or a configuration based on the LTE-Advanced which is regarded as the 4-th generation (4G) mobile telephone system.

As shown in FIG. 1, the radio communication system 10 adopts an SC-FDMA scheme for an uplink (hereinafter, UL) and adopts an OFDMA scheme for a downlink (hereinafter, DL). The OFDMA has a high resistance against a multipath interference and can flexibly accept a wide range of frequency bandwidths by changing the number of subcarriers. The SC-FDMA can provide a lower power consumption by reducing a peak-to-average power ratio (PAPR) of a radio terminal 2 and can reduce the interference by the orthogonalization of signals between users.

The radio communication system 10 adopts an FDD scheme as a duplex scheme. In other words, frequency bands are different in the UL and DL. A frequency band capable of being used in an uplink is referred to as an "uplink frequency band" and a frequency band capable of being used in a downlink is referred to as a "downlink frequency band". The uplink frequency band and the downlink frequency band are provided with a certain level of frequency spacing.

The radio communication system 10 adopts SON. In the present embodiment, the SON is achieved not by utilizing measurement performed by the radio terminal 2, but in such a manner that each radio base station 1 performs measurement on a radio signal from another radio base station 1.

Each radio base station 1 is connected to a core network which is a wired communication network. The core network is provided by a carrier and is configured of a router or the like. Each radio base station 1 can directly perform base station communications via an X2 interface which is a connection to be established in the core network.

(2) Configuration of Radio Base Station

Figure 2:
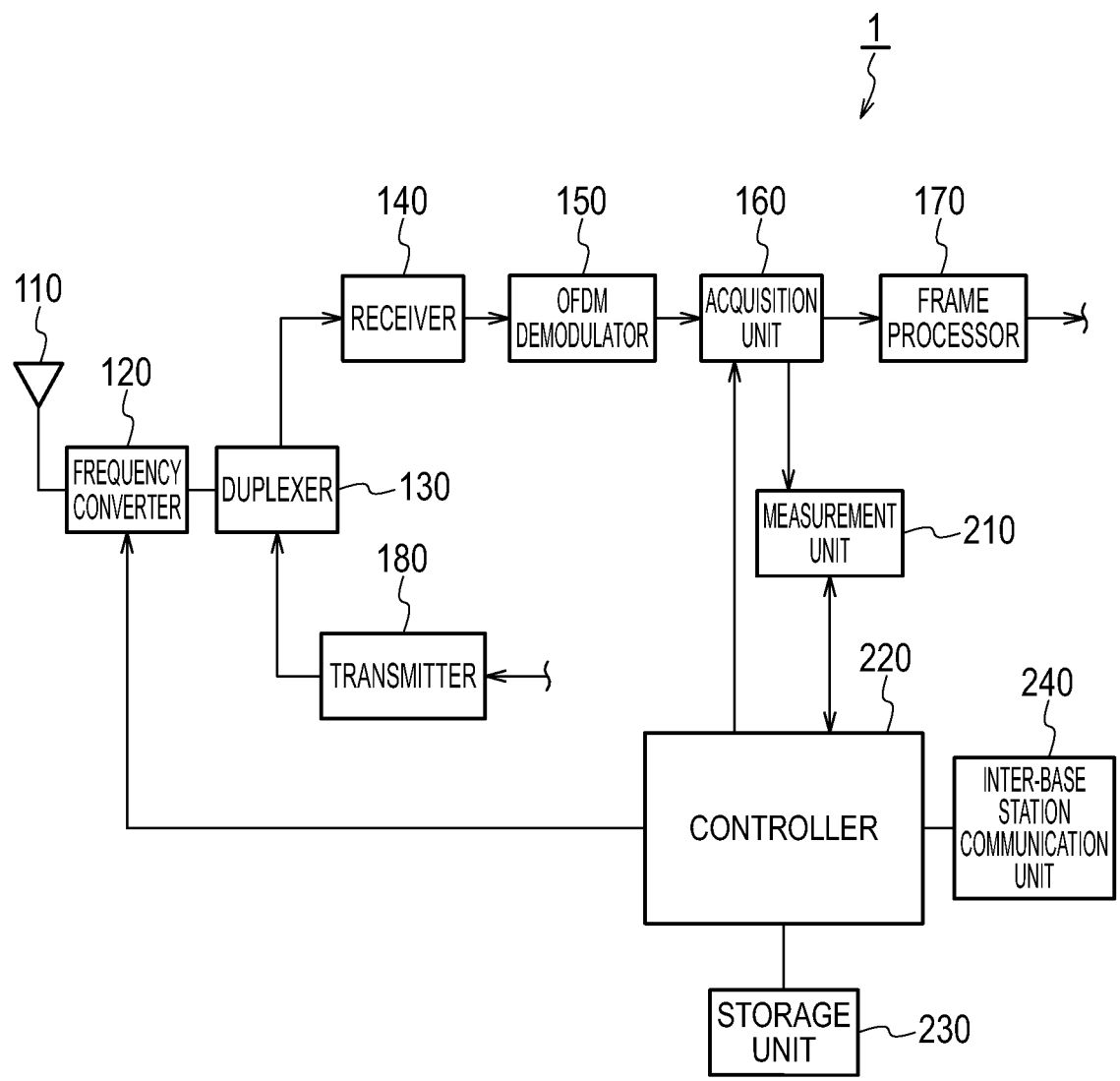
FIG. 2 is a block diagram showing a configuration of a radio base station according to an embodiment of the present invention.

Hereinafter, the configuration of the radio base station is described. FIG. 2 is a block diagram showing the configuration of the radio base station 1.

As shown in FIG. 2, receiver systems of the radio base station 1 include an antenna 110, a frequency converter 120 into which an output of the antenna 110 is inputted, a duplexer 130 into which an output of the frequency converter 120 is inputted, a receiver 140 into which an output of the duplexer 130 is inputted, an OFDM demodulator 150 into which an output of the receiver 140 is inputted, an acquisition unit 160 into which an output of the OFDM demodulator 150 is inputted, and a frame processor 170 into which an output of the acquisition unit 160 is inputted.

Transmitter systems of the radio base station 1 include a transmitter 180, the duplexer 130 into which an output of the transmitter 180 is inputted, the frequency converter 120 into which an output of the duplexer 130 is inputted, and the antenna 110 into which an output of the frequency converter 120 is inputted.

Controller systems of the radio base station 1 include a measurement unit 210 into which an output of the acquisition unit 160 is inputted, a controller 220 into which an output of the measurement unit 210 is inputted, a storage unit 230 which performs input/output of information with the controller 220, and an inter-base station communication unit 240 which performs input/output of information with the controller 220. The output of the controller 220 is inputted into the frequency converter 120 and the acquisition unit 160.

First of all, the configuration of the receiver systems is described.

The antenna 110 is for receiving and transmitting radio signals. The radio signal received by the antenna 110 contains a signal component corresponding to an uplink radio signal (an SF-FDMA signal transmitted by the radio terminal 2) and a signal component corresponding to a downlink radio signal (an OFDMA signal transmitted by another radio base station 1).

The frequency converter 120 is provided on a signal path between the antenna 110 and the duplexer 130. The frequency converter 120 performs frequency conversion in which a signal component of a downlink frequency band (a down carrier wave) being contained in the radio signal received by the antenna 110 is converted to a signal component of an uplink frequency band (an up carrier wave) according to a control signal from the controller 220. The configuration of the frequency converter 120 is described later in detail.

The duplexer 130 extracts the signal component of the uplink frequency band from the radio signal received by the antenna 110. When the frequency converter 120 performs frequency conversion, the duplexer 130 extracts the signal component of the downlink frequency band being contained in the radio signal received by the antenna 110 as a result. On the other hand, when the frequency converter 120 does not perform frequency conversion, the duplexer 130 removes the signal component of the downlink frequency band being contained in the radio signal received by the antenna 110.

The receiver 140 performs reception processing on the signal component of the uplink frequency band extracted by the duplexer 130. Here, the reception processing means amplification processing, a down conversion processing to a base bandwidth, or the like. Hereinafter, the signal component after the reception processing is referred to as a received signal.

The OFDM demodulator 150 converts the received signal acquired by the receiver 140 from a time domain to a frequency domain and performs a primary demodulation of the resultant signal. The conversion from the time domain to the frequency domain may use discrete Fourier transform (DFT) or the like, though in the present embodiment, fast Fourier transform (FFT) is used. With the FFT, the time domain signal is converted into a plurality of subcarrier signals (frequency domain signals). The primary demodulation is processing of performing demapping on data symbols mapped in each subcarrier signal.

The acquisition unit 160 acquires a data symbol inputted from the OFDM demodulator 150 to the frame processor 170 according to the control signal from the controller 220. The configuration of the frequency converter 120 is described later in detail.

The frame processor 170 is for performing signal processing dedicated for SC-FDMA, and, when the acquisition unit 160 does not acquire the data symbol inputted from the OFDM demodulator 150 to the frame processor 170, the frame processor 170 converts the data symbol acquired by the OFDM demodulator 150 from the frequency domain to the time domain and performs a secondary demodulation of the resultant symbol. The conversion from the time domain to the frequency domain may use inverse fast Fourier transform (IFFT) or the like, through in the present embodiment inverse discrete Fourier transform (IDFT) is used. With the IDFT, a frequency domain signal is converted to a time domain signal. The secondary demodulation means processing of performing demapping on original data by creating a constellation. Note that as for the details of the SC-FDMA signal processing, please refer to 3GPP TS 36.211, for example. The received data outputted by the frame processor 170 is inputted to an error correction decoder not shown in the drawing.

Next, the configuration of the transmitter systems is described.

The error correction encoded transmission data is inputted into an OFDM modulator not shown in the drawing and is subjected to mapping (modulation) into a plurality of subcarrier signals, and, thereafter, is converted to a time domain signal through the IFFT, so that a transmission signal (an OFDM signal) is created. The transmitter 180 performs amplification processing and up-convert processing to a high frequency band (an RF band) on the created transmission signal so as to create a radio signal. The created radio signal is transmitted via the duplexer 130.

Next, the configuration of the controller systems is described.

The inter-base station communication unit 240 receives information on the radio signal transmitted by another radio base station 1 (a neighboring base station) using inter-base station communications through the X2 interface. In the present embodiment, the inter-base station communication unit 240 receives an ID of the other radio base station 1, transmission power information showing transmission power of the radio signal transmitted by the other radio base station 1, and interference control information for reducing an inter-base station interference via the X2 interface from the other radio base station 1. The interference control information contains OI (Overload indication) which is information showing a degree of interference received by the other radio base station 1 in the uplink and RNTP (Relative Narrowband Tx Power) which is information for regulating the transmission power in the downlink.

The storage unit 230 accumulates interference control information received by the inter-base station communication unit 240. Also, the storage unit 230 stores various pieces of information to be used for the control by the controller 220.

Figure 3:
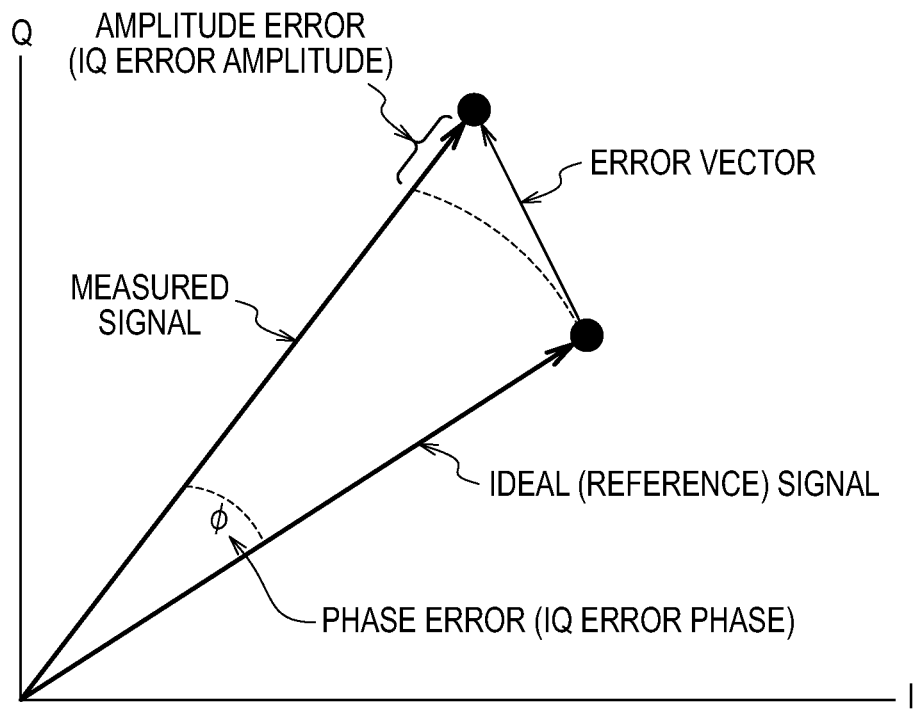
FIG. 3 is a drawing for illustrating EVM.

The measurement unit 210 measures a data symbol acquired by the acquisition unit 160. The measurement includes measurement of a signal quality which shows a degree of signal quality, measurement of transmission source ID contained in the signal, or the like. In the present embodiment, the measurement unit 210 measures RSSI (Received Signal Strength Indictor) or RSRP (Received Signal Received Power which shows received power. Here, the RSRP is measured for each resource block. The RSSI is measured for all resource blocks as a whole. In the following embodiment, the description is given to the RSSI as an example of received power measurement. Also, as shown in FIG. 3, the measurement unit 210 measures a EVM (Error Vector Magnitude) showing a magnitude of amplitude error and phase error between the data symbol and a reference point of the data symbol. Also, in the present embodiment, the measurement unit 210 performs measurement for every resource block configured using a plurality of subcarriers.

The EVM is obtained by the following equation, for example.

[Math 1]

$$EVM = \sqrt{\frac{\sum_{k=1}^{M} |z(k) - R(k)|^2}{\sum_{k=1}^{M} |R(k)|^2}} \quad (1)$$

where Z(k) is a demodulation signal (a complex number having I, Q components), R(k) is an already-kwon ideal signal (a complex number having I, Q components), and M is the number of subcarriers.

The controller 220 entirely controls the radio base station 1. The controller 220 outputs a control signal for activating the frequency converter 120 and the acquisition unit 160 when the radio base station 1 does not need to perform radio communications with the radio terminal 2. When the radio base station 1 does not need to perform radio communications with the radio terminal 2 means, for example, timing from the installation of the radio base station 1 to the start of a full-scale operation, or midnight.

The controller 220 determines a transmission parameter to be used when the transmitter 180 performs transmission processing on the radio signal based on the RSSI obtained by the measurement unit 210 and the transmission power information received by the inter-base station communication unit 240. Also, the controller 220 determines a transmission parameter to be used when the transmitter 180 performs transmission processing on the radio signal based on the EVM obtained by the measurement unit 210 and the interference control information received by the inter-base station communication unit 240. The transmission parameter means transmission power for each resource block, for example. A specified example of the control by the controller 220 is described later.

(2.1) Configuration of Frequency Converter

Figure 4:
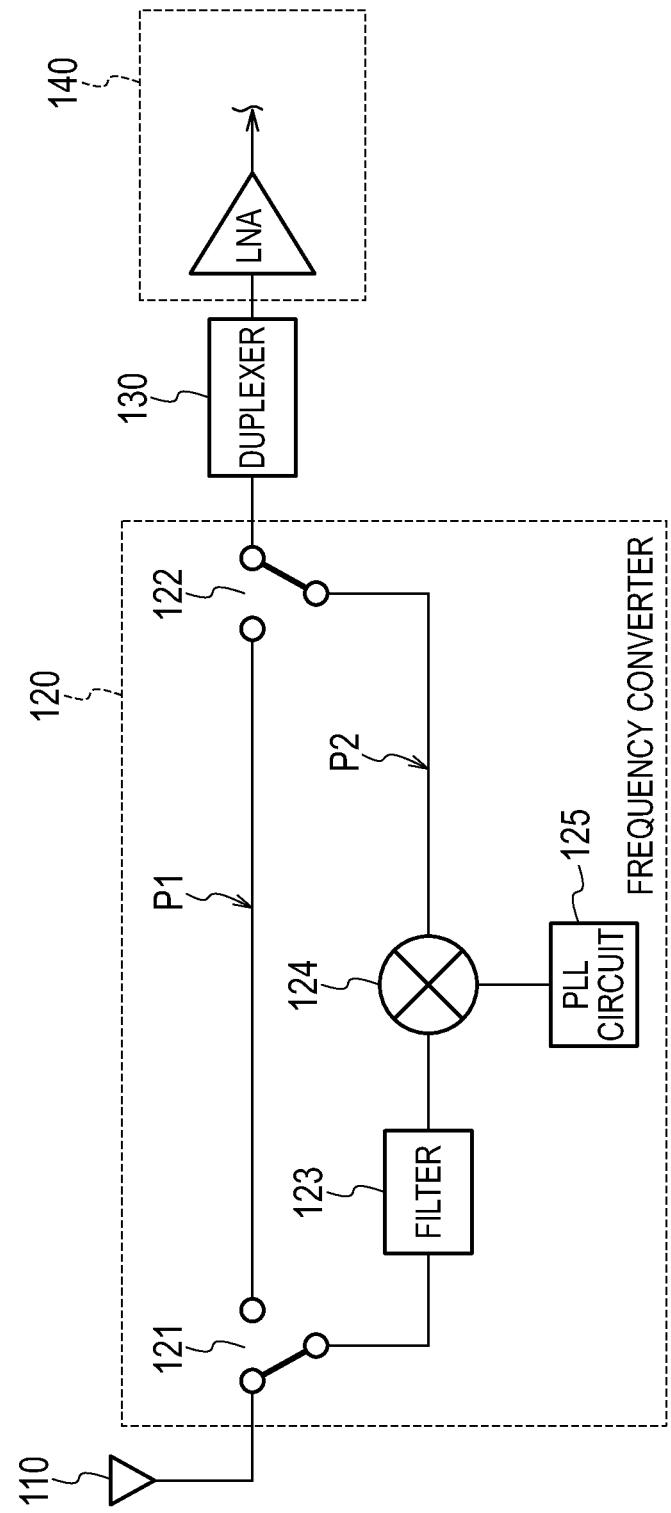
FIG. 4 is a block diagram showing a configuration of a frequency converter according to an embodiment of the present invention.

Next, the configuration of the frequency converter 120 is described. FIG. 4 is a block diagram showing the configuration of the frequency converter 120.

As shown in FIG. 4, the frequency converter 120 has two signal paths P1, P2. The frequency converter 120 has a switch 121 provided in a branch point between the signal path P1 and the signal path P2, a switch 122 provided in a junction between the signal path P1 and the signal path P2, a filter 123 and a mixer 124 which are provided on the signal path P2, and a PLL circuit 125 connected to the mixer 124.

The filter 123 extracts a signal component of a downlink frequency band from the radio signal received by the antenna 110. The PLL circuit 125 creates a conversion signal with a predetermined frequency. The mixer 124 performs conversion to an uplink frequency band by mixing the signal component of the downlink frequency band extracted by the filter 123 with the conversion signal.

The switch 121 and the switch 122 configure a switching unit to cause the radio signal received by the antenna 110 to pass through or avoid the filter 123 and the mixer 124 by switching. At the timing when the radio base station 1 does not perform a radio communicate with the radio terminal 2, the controller 220 controls the switch 121 and the switch 122 so that the radio signal received by the antenna 110 passes through the filter 123 and the mixer 124. In other words, the controller 220 controls the switch 121 and the switch 122 so as to perform switching to the signal path P2 side.

(2.2) Configuration of Acquisition Unit

Figure 5:
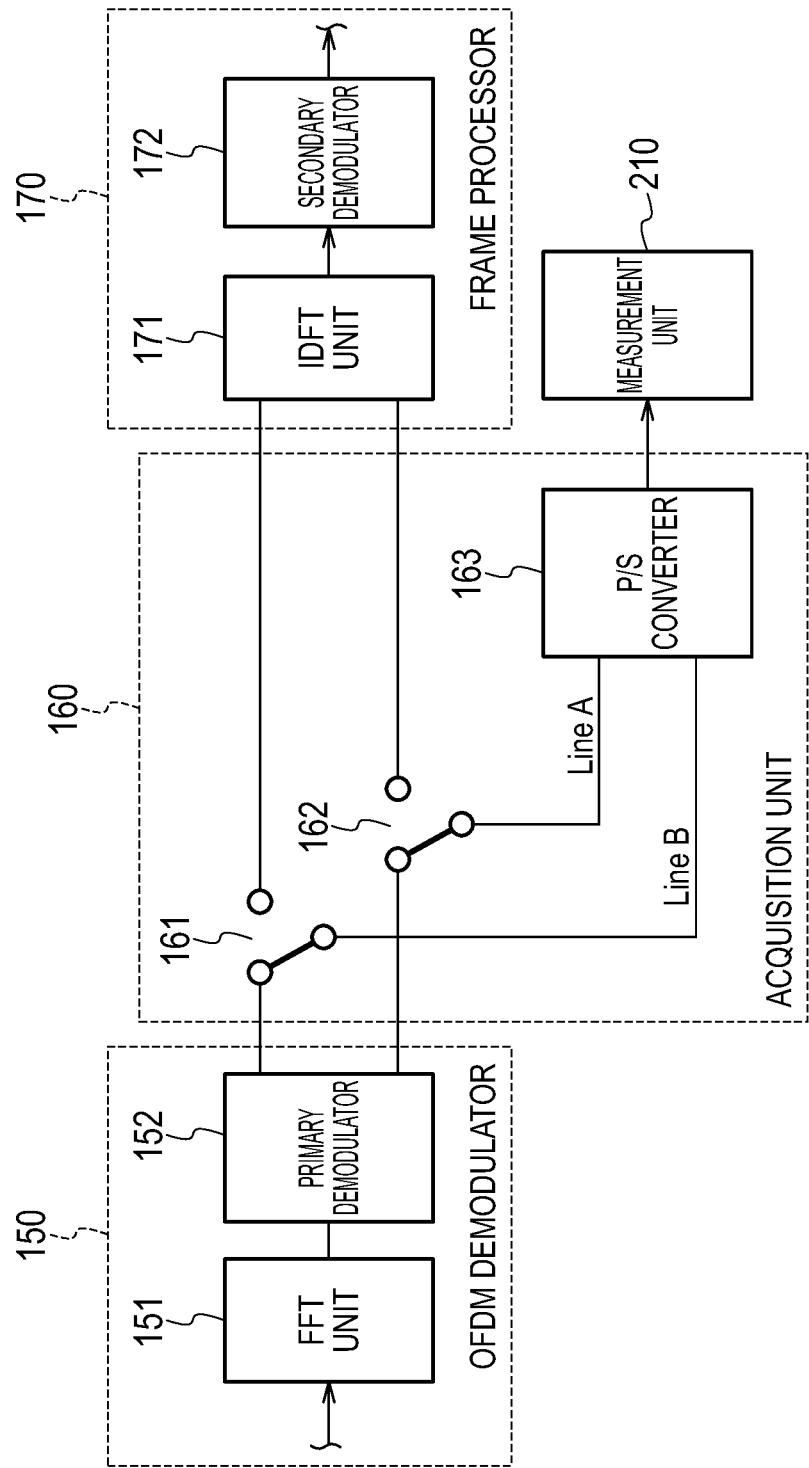
FIG. 5 is a block diagram showing a configuration of an acquisition unit according to an embodiment of the present invention.

Next, the configuration of the acquisition unit 160 is described. FIG. 5 is a block diagram showing the configuration of the acquisition unit 160.

As shown in FIG. 5, the acquisition unit 160 has a switch 161 and a switch 162 which are respectively provide on the signal paths between the OFDM demodulator 150 and the frame processor 170 and a P/S converter 163 into which an output of each of the switch 161 and the switch 162 is inputted.

The switch 121 and the switch 122 cause the data symbol outputted by the OFDM demodulator 150 to be inputted or not to be inputted into the P/S converter 163 by switching. At the timing when the radio base station 1 does not perform a radio communication with the radio terminal 2, the controller 220 controls the switch 121 and the switch 122 so as to input the data symbol outputted by the OFDM demodulator 150 into the P/S converter 163. The P/S converter 163 converts the data symbol outputted by the OFDM demodulator 150 from parallel to serial. The data symbol converted to serial is inputted into the measurement unit 210.

Note that the OFDM demodulator 150 has an FFT unit 151 and a primary demodulator 152 into which an output of the FFT unit 151 is inputted. The frame processor 170 has an IDFT unit 171 into which outputs of the switch 121 and the switch 122 are input and a secondary demodulator 172 into which an output of the IDFT unit 171 is inputted.

Here, using FIG. 6, the respective signal processing of the OFDMA scheme and the SC-FDMA scheme are described in comparison with each other.

As shown in FIG. 6, in the OFDM scheme, the transmission side performs S/P conversion of the data symbol created with QPSK or the like, and, thereafter, converts each subcarrier, and then performs conversion to a time domain signal through the IFFT. After that, for each symbol time, a cyclic prefix (CP) longer than a multipath delay time is inserted and transmitted. The reception side removes the CP and performs conversion to a subcarrier signal through the FFT for each symbol length.

Data can be restored when parallel-serial conversion is performed after the data symbol is demodulated from each sub-carrier.

In the SC-FDMA, the transmitter side performs pre-coding processing (primary demodulation) in which the data symbol created through the QPSK or the like is converted to a frequency domain signal through the DFT, and, then, creates a transmission signal by the processing similar to that of the OFDMA. The reception side creates a data symbol from the received signal by the processing similar to that of the OFDMA and performs secondary demodulation (frame processing) in which the frequency domain signal is converted to a time domain signal through the IDFT.

As described above, it can be seen that the SC-FDMA is the one in which the frame processing is added to the OFDM. Therefore, as shown in FIG. 5, the acquisition unit 160 sends a signal demodulated after the FFT (specifically, a signal demodulated after FFT and phase compensation) to the measurement unit 210 after the P/S conversion. It is assumed here that a length of a line (Line A) from the switch 121 to the P/S converter 163 is equal to a length of a line (Line B) from the switch 122 to the P/S converter 163.

(3) Example of Controlling Radio Base Station

Hereinafter, an example of controlling the radio base station 1 is described.

When the radio base station 1 is installed with a view to expanding a service area, the radio base station 1 accumulates an ID and interference control information of a neighboring base station, which are received via the X2 interface. Then, the radio signal transmitted by the neighboring base station is received, the radio signal being compared with the transmission power information obtained by the X2 interface. Thereafter, a transmission parameter which can cover a cell edge of the own service area is determined.

Also, when maintenance by the already-installed radio base station 1 is aimed, a parameter of the neighboring base station, which is regularly obtained by the X2 interface is compared with the RSSI and EVM which are received by the own radio base station 1. Then, a change in a surrounding environment (for example, the construction of high-rise buildings or a failure of a high-frequency amplifier of the neighboring base station) is detected, and a transmission parameter of the own station is changed. This can establish a call connection with a radio terminal in a coverage hole generated in the cell edge of the neighboring base station.

Figure 7:
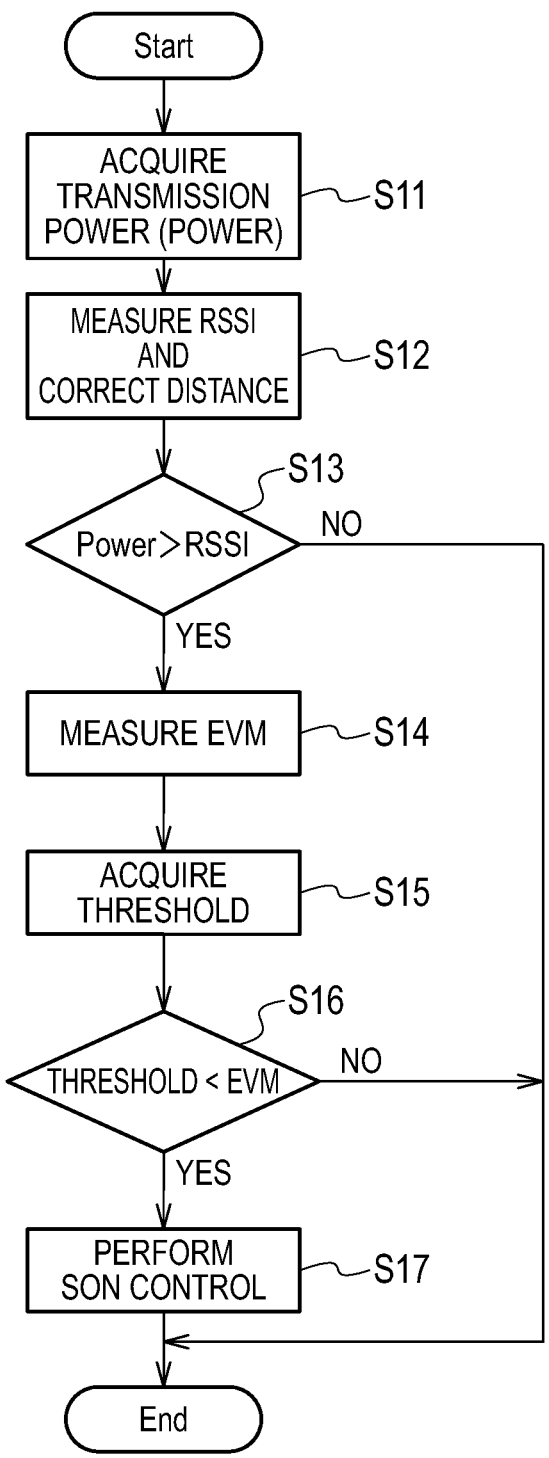
FIG. 7 is a flowchart showing an example of controlling a radio base station according to an embodiment of the present invention.

FIG. 7 is a flowchart showing an example of controlling the radio base station 1.

At step S11, the controller 220 acquires transmission power information received by the inter-base station communication unit 240 and stored in the storage unit 230.

At step S12, the controller 220 activates the frequency converter 120 and the acquisition unit 160 and also controls the measurement unit 210 so as to measure RSSI. The RSSI measured by the measurement unit 210 is inputted into the controller 220.

Figure 8:
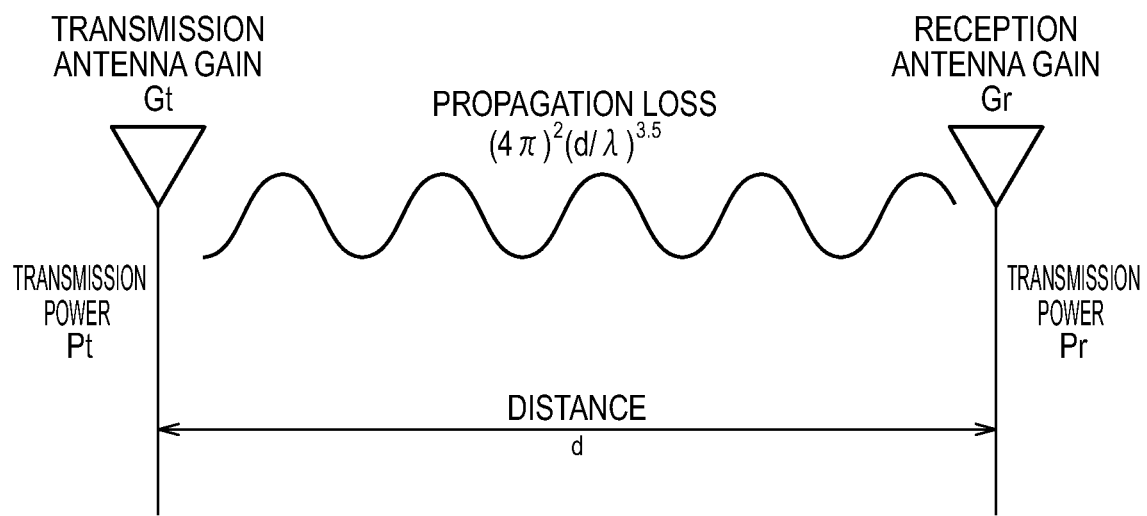
FIG. 8 is a drawing showing a transmission loss model.

The controller 220 performs distance correction on the measured RSSI. In the following description, the distance correction is described referring to a propagation loss model shown in FIG. 8.

Electric waves decay at the inverse square of the distance from a source in free space. Since a distance d between the neighboring base station and the own station can be obtained from a neighbor list stored in the storage unit 230 in advance, transmission power Pt of the neighboring base station can be obtained from Friis' transmission equation where Pr=RSSI is set.

$$P_r/P_t = G_t G_r (4\pi d/\lambda)^2 \qquad (2)$$

where Pr: received power [dBm], Pt: transmission power [dBm], Gt: a transmission antenna gain [dB], Gr: a reception antenna gain [dB], λ: a wavelength [m], and d: a distance between transmission and reception [m].

In the present embodiment, transmission power in an antenna end of the neighboring base station is obtained from RSSI, which is defined as distance correction of RSSI, and transmission power of the neighboring base station is calculated from the following equation in consideration of effects of constructions (decay proportionally to the inverse 3.5th power of the distance).

$$Pr = Pt + Gt - 20\log 4\pi + 35\log(\lambda/d) + Gr \qquad (3)$$

At step S13, the controller 220 compares the transmission power information acquired from the storage unit 230 with the RSSI after the distance correction. When the transmission power information is larger than the RSSI after the distance correction, it means that there is a failure of a power amplifier of the neighboring base station or there exists a building or the like between the controller 220 and the neighboring base station. When the transmission power information is larger than the RSSI after the distance correction, the processing proceeds to step S14.

At step S14, the controller 220 keeps the frequency converter 120 and the acquisition unit 160 in operation, and controls the measurement unit 210 so as to measure EVM. The EVM measured by the measurement unit 210 is inputted into the controller 220.

At step S15, the controller 220 acquires a threshold of EVM from the storage unit 230.

At step S16, the controller 220 compares the EVM measured by the measurement unit 210 with the threshold acquired from the storage unit 230. When the EVM measured by the measurement unit 210 is larger than the threshold acquired from the storage unit 230, the processing proceeds to step S17.

At step S17, the controller 220 performs SON control, i.e., performs determination of a transmission parameter. For example, the controller 220 determines a transmission parameter which can cover the cell edge of the service area of the own station. Or, the controller 220 determines a transmission parameter which can cover the coverage hole generated in the cell edge of the neighboring base station.

(4) Advantageous Effects

As described above, the radio base station 1 according to the present embodiment converts a signal component of a downlink frequency band (in other words, a component of a radio signal transmitted by the neighboring base station) contained in the radio signal received by the antenna 110 to a signal component of an uplink frequency band, and then input it to the duplexer 130. With this, the component of the radio signal transmitted by the neighboring base station can pass through the duplexer 130, so that the component of the radio signal transmitted by the neighboring base station can be measured. Accordingly, in the radio communication system 10 adopting the FDD scheme, the own radio base station 1 can measure the radio signal transmitted by the neighboring base station.

Also, according to the present embodiment, measurement is performed on the data symbol inputted from the OFDM demodulator 150 to the frame processor 170 by focusing on the point such that the signal processing in the SC-FDMA scheme is the one in which the frame processing is added to the signal processing in the OFDM scheme. With this, measurement can be performed on the data symbol corresponding to the radio signal in the OFDMA scheme (i.e., the radio signal transmitted by the neighboring base station). Accordingly, in the radio communication system 10 in which the SC-FDMA scheme is adopted for the UL and the FDMA scheme is adopted for the DL, the own radio base station 1 can perform measurement on the radio signal transmitted by the neighboring base station. Also, the measurement is performed on the state of having been converted to the frequency domain, so that measurement can be performed for each subcarrier or resource block.

Also, in the present embodiment, the measurement by the measurement unit 210 is performed at the timing when the radio base station 1 does not perform a radio communication with the radio terminal 2. Accordingly, an operational status of the neighboring base station can be known without preventing the radio communication with the radio terminal 2. Also, the operational status of the neighboring base station can be known even during a period from the installation of the radio base station 1 to the start of the full-scale operation.

Furthermore, in the conventional method, measurement cannot be performed in a state where a radio terminal is not present in a position where radio signals are receivable from a plurality of radio base stations. However, according to the method of the present embodiment, measurement can be performed even in that state.

As described above, in the present embodiment, when a large change is caused in a surrounding building or when a failure is caused in a high-frequency amplifier (PA: Power Amplifier) of the neighboring base station, the change in the surrounding environment can be detected and the operational status of the neighboring base station can be detected only by the radio base station 1.

(5) Other Embodiments

The present invention has been described by the embodiment. However, it should not be understood that the discussion and drawings which constitute one part of this disclosure limit the present invention. Various alternative embodiments, examples, and operational techniques will be apparent for those who are in the art.

(5.1) Modification 1

Figure 9:
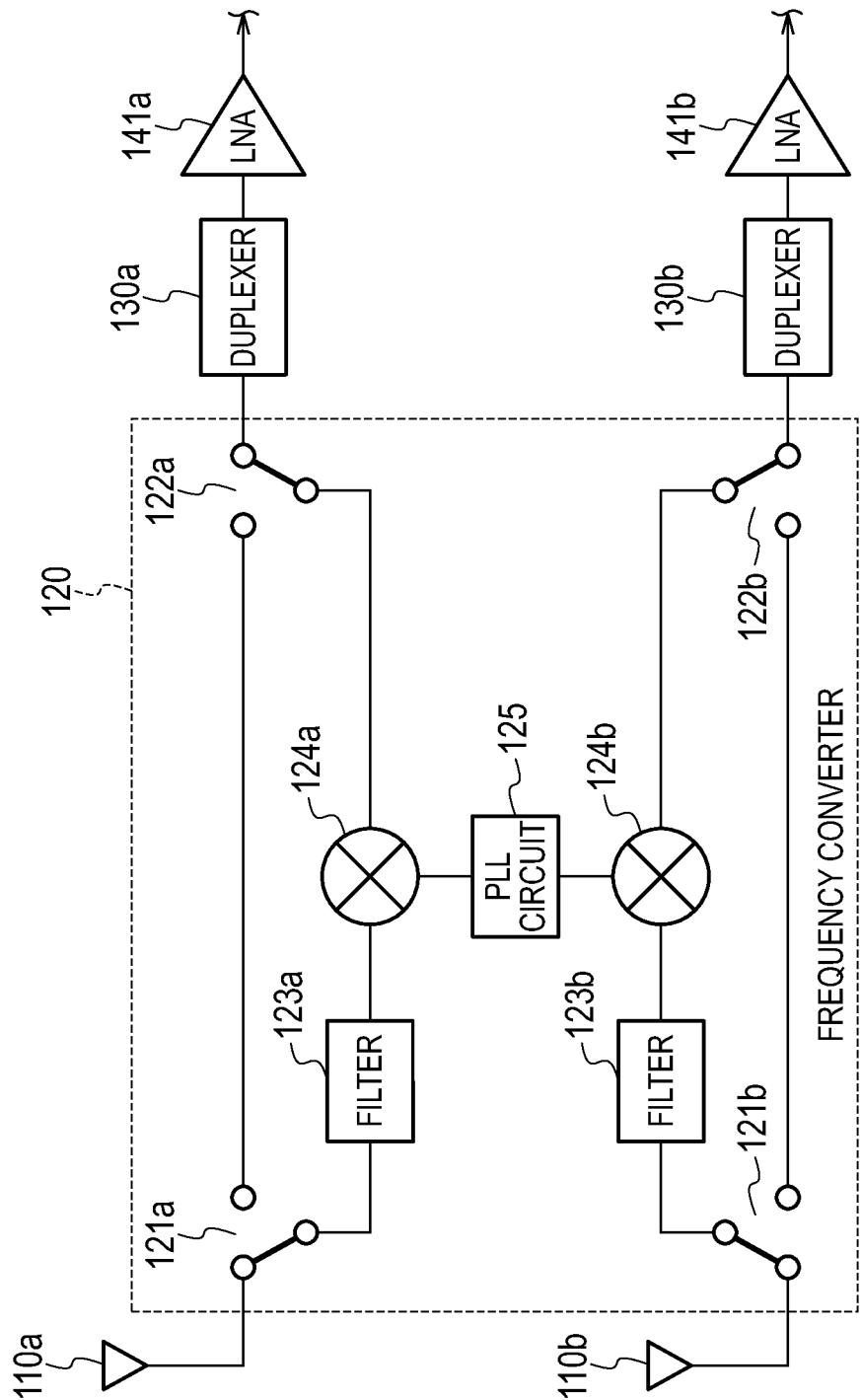
FIG. 9 is a block diagram showing a configuration of a frequency converter according Modification 1 of the embodiment of the invention.

In the above-described embodiment, the number of the antennas 110, provided in the radio base station 1, is one. However, the configuration compliant with a multi-antenna technique such as MIMO (Multiple Input Multiple Output) is possible. FIG. 9 shows a configuration compliant with 2×2 MIMO in which a transmission side and a reception side respectively use two antennas.

As shown in FIG. 9, a radio base station 1 has two antennas 110a, 110b and two duplexers 130a, 130b, and a frequency converter 120 is provided on a signal path between the antennas 110a, 110b and the duplexers 130a, 130b. The frequency converter 120 has a circuit configuration similar to that of the above-described embodiment, but a PLL circuit 125 can be shared.

(5.2) Modification 2

In the above-described embodiment, the acquisition unit 160 acquires a signal (a data symbol) after the primary demodulation by the OFDM demodulator 150. However, the configuration in which a signal before the primary demodulation is acquired is possible.

Figure 10:
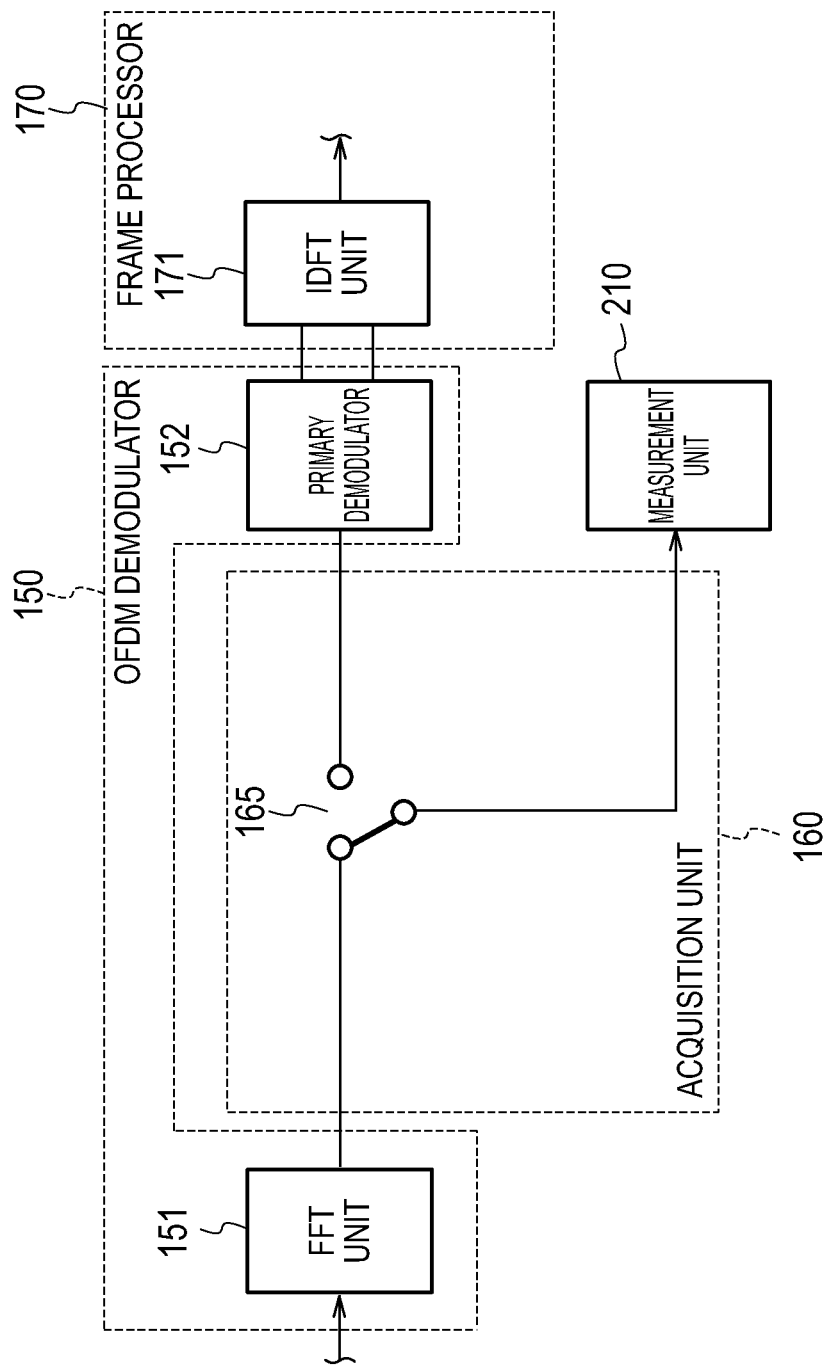
FIG. 10 is a block diagram showing a configuration of an acquisition unit according to Modification 2 of the embodiment of the invention.

FIG. 10 is a block diagram showing a configuration of an acquisition unit 160 according the present modification. As shown in FIG. 10, the acquisition unit 160 has a switch 165 provided on a signal path between an FFT unit of an OFDM demodulator 150 and a primary demodulator 152. The switch 165 switches if a signal of a frequency domain to be output by the FFT unit 151 (specifically, a signal subjected to P/S conversion after conversion to a frequency domain) is inputted to the measurement unit 210. The controller 220 controls the switch 165 so as to input the signal of the frequency domain to be output by the FFT unit 151 at the timing when the radio base station 1 does not perform a radio communication with the radio terminal 2.

With this configuration, received power for each subcarrier can be measured in a plain circuit configuration.

(5.3) Modification 3

In the above-described embodiment, the description is given to the radio communication system 10 in which the SC-FDMA scheme is adopted for the UL and the OFDMA scheme is adopted for the DL. However, a frequency converter 120 can be adopted for a radio communication system adopting another radio access scheme as long as the radio communication system adopts the FDD scheme.

Figure 11:
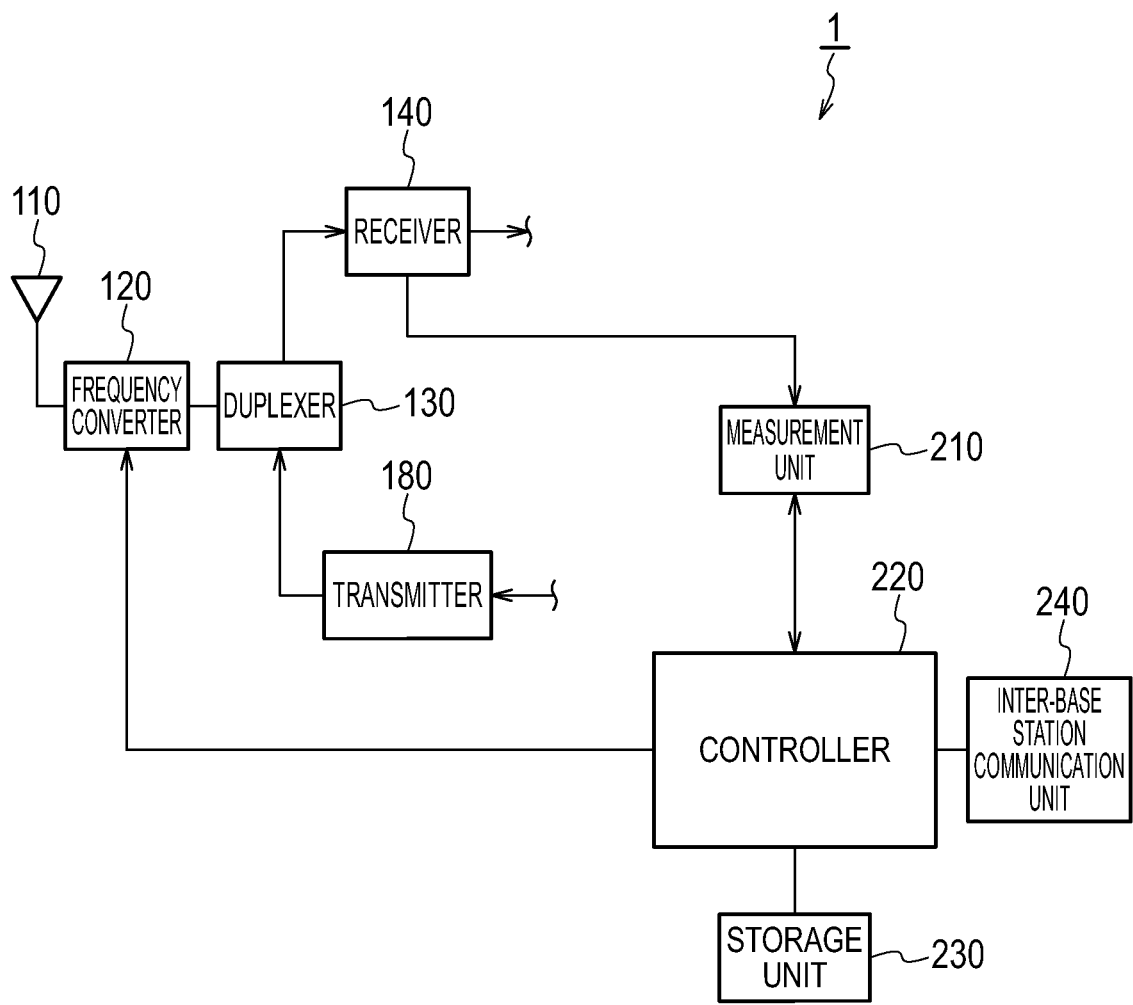
FIG. 11 is a block diagram showing a configuration of a radio base station according to Modification 3 of the embodiment of the invention.

FIG. 11 is an example of a configuration of a radio base station 1 used in an FDD scheme radio communication system in which an arbitrary radio access scheme is employed. As shown in FIG. 11, a radio base station 1 according to the present modification is different from the above-described embodiment in that a measurement unit 210 performs measurement on a signal which is subjected to reception processing in a receiver 140. For example, since RSSI can be measured at the stage of the receiver 140, such configuration can be employed.

(5.4) Modification 4

In the above-described embodiment, the description is given to the LTE system in the FDD mode. However, it can be applied to an LTE system in a TDD mode. In the LTE system in the TDD mode, an SC-FDMA scheme is adopted for an UL and an FDMA scheme is adopted for a DL, but a complex communication system is a TDD.

Figure 12:
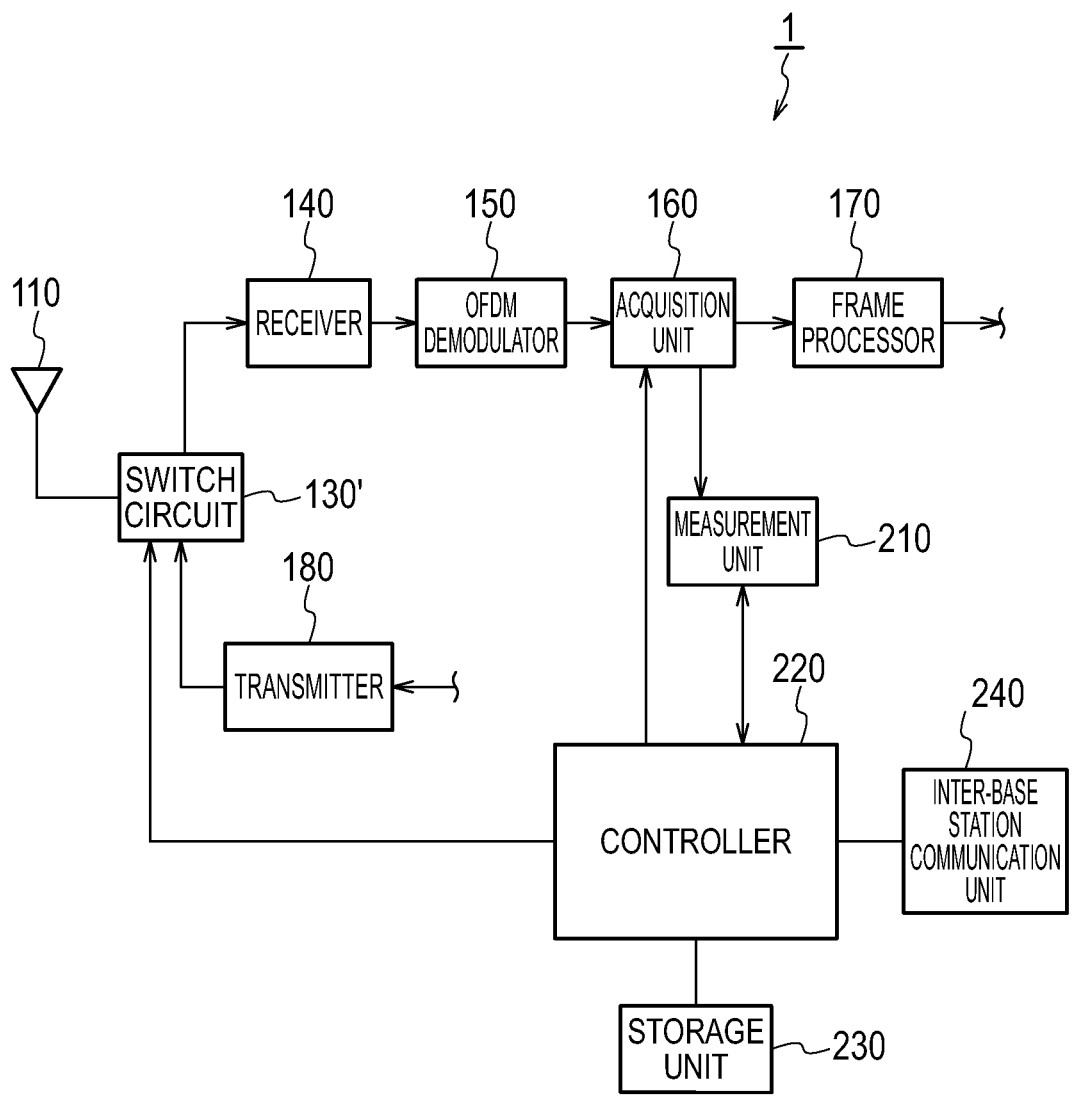
FIG. 12 is a block diagram showing a configuration of a radio base station according to Modification 4 of the embodiment of the invention.

FIG. 12 is a block diagram showing a configuration of the radio base station 1 according to the present modification. As shown in FIG. 12, the radio base station 1 according to the modification does not have the frequency converter 120 according to the above-described embodiment. Also, in place of the duplexer 130, the radio base station 1 has a switch circuit 130' for switching transmission and reception according to time division.

(5.5) Modification 5

In the above-described embodiment, it is assumed that the radio base station 1 is a macrocell base station forming a large cell. However, it is not limited to the macrocell base station, and the present invention may be applied to a femtocell or picocell base station which forms a small cell.

As described above, it should be understood that the present invention contains various embodiments which are not described herein. Accordingly, the present invention is only limited by the scope of claims and matters specifying the invention, which are appropriate from this disclosure.

Note that the contents of Japanese Patent Application No. 2010-70653 (filed on Mar. 25, 2010) are hereby incorporated by reference in their entirety.

Industrial Applicability

As described above, a radio base station and a communication control method according to the present invention enable knowing of an operational status of a neighboring base station even at the timing when radio communications with a radio terminal are not performed, without giving a load to the radio terminal. Thus, the present invention is useful in a radio communication such as a mobile communication.

The invention claimed is:

1. A radio base station used in an FDD radio communication system in which an uplink frequency band is different from a downlink frequency band, comprising:
   at least one antenna;
   at least one duplexer configured to extract a signal component of the uplink frequency band from a radio signal received by the antenna;
   a frequency converter provided on a signal path between the antenna and the duplexer and is configured to convert a signal component of the downlink frequency band contained in the radio signal received by the antenna to a signal component of the uplink frequency band;

a measurement unit configured to perform a measurement on the signal component of the uplink frequency band extracted by the duplexer, wherein the measurement unit measures received power;

a transmitter configured to transmit a radio signal via the duplexer and the antenna;

an inter-base station communication unit configured to receive transmission power information showing transmission power of a radio signal transmitted by another radio base station by using an inter-base station communication; and a controller configured to determine a transmission parameter to be used when the transmitter performs transmission processing on a radio signal, based on received power information obtained by the measurement unit and the transmission power information received by the inter-base station communication unit.

2. The radio base station according to claim 1, wherein the controller, at timing when the radio base station does not perform a radio communication with a radio terminal, performs control to cause the frequency converter to perform the frequency conversion and to cause the measurement unit to perform the measurement.

3. The radio base station according to claim 2, wherein the frequency converter includes a filter configured to extract the signal component of the downlink frequency band from the radio signal received by the antenna, a mixer configured to convert the signal component of the downlink frequency band to the signal component of the uplink frequency band by mixing the signal component of the downlink frequency band with a conversion signal, and a switching unit configured to cause the radio signal received by the antenna to pass through or avoid the filter and the mixer by switching, and the controller controls the switching unit so that the radio signal received by the antenna passes through the filter and the mixer at the timing when the radio base station does not perform a radio communication with the radio terminal.

4. A radio base station used in an FDD radio communication system in which an uplink frequency band is different from a downlink frequency band, comprising:

at least one antenna;

at least one duplexer configured to extract a signal component of the uplink frequency band from a radio signal received by the antenna;

a frequency converter provided on a signal path between the antenna and the duplexer and configured to convert a signal component of the downlink frequency band contained in the radio signal received by the antenna to a signal component of the uplink frequency band;

a measurement unit configured to perform a measurement on the signal component of the uplink frequency band extracted by the duplexer;

a receiver configured to perform reception processing on a radio signal in an SC-FDMA scheme or OFDMA scheme via the duplexer;

an OFDM demodulator configured to convert the received signal obtained by the receiver from a time domain to a frequency domain and perform a primary demodulation of the resultant signal; and a frame processor configured to convert a data symbol obtained by the OFDM demodulator from a frequency domain to a time domain and perform a secondary demodulation of the resultant symbol, wherein the measurement unit performs measurement on a signal which is a signal after conversion to the frequency domain by the OFDM demodulator and the signal before conversion to the time domain by the frame processor.

5. A communication control method for a radio base station used in an FDD radio communication system in which an uplink frequency band is different from a downlink frequency band, comprising:

a frequency conversion step of performing a frequency conversion to convert a signal component of the downlink frequency band contained in a radio signal received by the antenna of the radio base station, to a signal component of the uplink frequency band;

an extraction step of extracting a signal component of the uplink frequency band from the radio signal after the frequency conversion;

a measurement step of performing a measurement on the signal component of the uplink frequency band extracted by the extraction step;

a reception step of receiving transmission power information showing transmission power of a radio signal transmitted by another radio base station by using an inter-base station communication; and a determination step of determining a transmission parameter to be used when the radio base station performs transmission processing on the radio signal, wherein in the measurement step, received power is measured, and in the determination step, the transmission parameter is determined based on received power information showing the received power measured in the measurement step and the transmission power information received in the reception step.

* * * * *